United States Patent [19]

Kleeb et al.

[11] Patent Number: 4,506,025
[45] Date of Patent: Mar. 19, 1985

[54] SILICA CASTABLES

[75] Inventors: Thomas R. Kleeb, Pittsburgh; George H. Criss; Donald O. McCreight, both of Bethel Park, all of Pa.

[73] Assignee: Dresser Industries, Inc., Dallas, Tex.

[21] Appl. No.: 592,133

[22] Filed: Mar. 22, 1984

[51] Int. Cl.³ ............................................. C04B 35/14
[52] U.S. Cl. ..................................... 501/124; 501/133
[58] Field of Search ................................ 501/124, 133

[56] References Cited

U.S. PATENT DOCUMENTS 2,736,660  2/1956  Barlow ............................... 501/124

FOREIGN PATENT DOCUMENTS 2429762  2/1980  France ................................ 501/124
78476    6/1981  Japan ................................. 501/124

Primary Examiner—James Poer
Attorney, Agent, or Firm—Barry E. Deutsch

[57] ABSTRACT

A castable silica refractory consisting essentially of 58–78 by weight percent amorphous silica selected from the group consisting of vitreous and fused silica or a combination thereof; 10–30 by weight percent quartzite; 4–10 by weight percent volatilized silica; 2–3 by weight percent wollastonite powder; and 1–3 by weight percent white portland cement; plus as additions about 0.4 by weight percent water reducing agent and 6–10 by weight percent water.

8 Claims, No Drawings

SILICA CASTABLES

BACKGROUND OF THE INVENTION

This invention relates to castable refractories, and in particular to castable refractories composed primarily of fused or vitreous silica.

The best quality refractories are usually furnished by the manufacturers as pressed and fired brick. Proper installation of brick refractories often requires the use of special shapes, cutting of the brick, and meticulous installation thereof by skilled masons. Many refractory users have resorted to the use of monolithic refractory linings, due to their lower initial cost and easier and quicker installation. These refractories, supplied as castables, plastics, ramming mixes, gunning mixes and trowelling mixes, are suitable for most applications. Their properties, however, are not equal to those of brick since bonding agents such as cements, clays or organic and inorganic chemicals are used which may have an adverse effect on the composite chemistry of the product, or may prevent maximum density from being achieved in forming the refractory lining.

Refractories made from pure silica provide excellent high temperature load bearing characteristics. Principal uses for silica refractories are in coke ovens, glass melting furnace crowns and, in Europe, as checker brick in blast furnace stoves. Although pure silica is a very refractory material, small additions of alkalies, alumina or lime will lower its refractoriness markedly. In the manufacture of silica brick, a level of 2.0 to 3.5% lime is desired so that sintering will occur on firing. However, lime contents exceeding this range, or alumina contents exceeding 0.5%, lower refractoriness to an undesirable level. For special applications of silica brick, the maximum alumina content allowed is 0.35%. A monolithic silica refractory having the same chemistry as silica brick must be bonded with portland cement, since the alumina content of calcium aluminate cement is too high. However, the amount of portland cement must be controlled and cannot exceed 2% for special applications of the silica brick and 3% for regular applications of silica brick, since portland cement contains a small amount of alumina and higher cement contents will cause the maximum alumina to be exceeded. At the relatively low levels of cement, additional lime is desired to allow adequate sintering of the brick when the brick is fired. Possible lime sources include hydrated lime, which is commonly used in the manufacture of silica brick, limestone, gypsum, plaster, calcium nitrate and whiting. As the foregoing are all calcium salts or hydrates, they loose weight on firing, causing a refractory containing them to loose density.

Further, most silica monolithic refractories are based on vitreous or fused silica grain which enables the refractories to be rapidly heated in service. At elevated temperatures, these refractories shrink to some degree as the grains sinter. This is objectionable in some applications, particularly in coke oven repairs, where dimensional stability on heating is a must.

Accordingly, it is an object of this invention to provide a silica castable which, in service, has the same properties as silica brick. Specifically, it is an object of this invention to provide a silica castable which does not loose weight on firing, nor does the castable shrink as the grains sinter.

SUMMARY OF THE INVENTION

The foregoing objects are achieved in a castable silica refractory consisting essentially of 58-78 by weight percent amorphous silica selected from the group consisting of vitreous and fused silica or a combination thereof, 10 to 30 by weight percent quartzite, 4 to 10 by weight percent volatilized silica, 2 to 3 by weight percent wollastonite powder, and 1 to 3 by weight percent white portland cement; plus as additions about 0.4 by weight percent water-reducing agent and 6 to 10 by weight percent water.

DESCRIPTION OF THE PREFERRED EMBODIMENT

The present invention relates to a castable refractory, consisting essentially of an amorphous silica selected from the group consisting of fused and vitreous silica or the combination thereof, quartzite, wollastonite, white portland cement and volatilized silica formed in the production of ferrosilicon. Further, a water reducing agent is used to reduce porosity and normally the addition of water in the amount of 6 to 10 by weight percent of the total mix is required to temper the mix to castable consistency. If required, a small percent of organic fibers may be added to the mix.

Vitreous silica, $SiO_2$, sometimes referred to as fused quartz, is a non-crystalline silica glass having a very low thermal expansion between room temperature and 2000° F. Above 2000° F., vitreous silica begins to densify or crystallize into cristobalite, one of the crystalline forms of silica. Wollastonite is a calcium metasilicate, $CaSiO_3$. In its pure form, it is a brilliant white in color, and when crushed, the particles tend to be needle shaped, thereby imparting strength to any mix including the wollastonite. The volatilized silica and extremely fine amorphous silica are over 50% finer than 0.5 microns. The other components are conventional raw materials used commonly in various applications throughout a broad spectrum of industries.

The important discovery of this invention is a silica mix that can be cast to virtually any desired shape and can be used as either unburned or burned brick. The mix will have chemical, physical and thermal properties that are at least the equivalent of a super duty fired silica brick. Typical chemical analysis of the raw materials used to prepare this castable are shown in Table 1. Silica brickbats may serve as the source of quartzite.

TABLE I

| Chemical Analysis | Fused Silica | Quartzite or | Silica Brick Bats | Volatilized Silica | White Portland Cement | Wollastonite |
|---|---|---|---|---|---|---|
| Silica ($SiO_2$) | 99.6% | 98.9% | 95.8% | 93.6% | 25.27 | 51.4% |
| Alumina ($Al_2O_3$) | 0.20 | 0.64 | 0.53 | 0.3 | 4.10 | 0.2 |
| Iron Oxide ($Fe_2O_3$) | 0.20 | 0.25 | 0.64 | 0.05 | 0.80 | 0.12 |
| Lime (CaO) | 0.3 | 0.03 | 2.8 | 0.3 | 66.0 | 47.9 |
| Magnesia (MgO) | 0.02 | 0.06 | 0.1 | 0.2 | 1.58 | 0.3 |
| Total Alkalies | 0.03 | 0.03 | 0.1 | 0.2 | — | — |

TABLE I-continued

| Chemical Analysis | Fused Silica | Quartzite | Silica Brick Bats or | Volatilized Silica | White Portland Cement | Wollastonite |
|---|---|---|---|---|---|---|
| Sulfur Oxide (SO$_3$) | — | — | — | — | 2.22 | — |

As shall be described in detail, it has been found that the addition of wollastonite and quartzite to a vitreous silica-based, low-cement castable increases the density, lowers the porosity and increases the thermal stability when the castable is unfired or burned, making it equivalent to a burned silica brick. Tests on a series of mixes in Tables II and III will show the effect of these additions.

In Table II, a series of size graded batches were made aimed at showing how the addition of wollastonite and quartzite effect both the density and thermal stability of the castable after being burned at 2700° F. with a 10 hour hold. A typical screen analysis of the castable of the invention is shown in Table II, although this may be varied over a broad range as desired.

To manufacture the brick, the dry castable and the desired amount of water are added to the mixes to bring the batch to casting consistency. The mixing time must be sufficient, which is usually 4 to 5 minutes, to solubilize the wetting agent. The castable should be placed in a mold of any desired shape, then densified by vibrating the mold with a high frequency vibrator. The set time may vary depending on the particular composition used. However, in selecting the composition, care must be exercised to keep the alumina content less than 0.3% and the lime should be held in the range of 2.5% and 3.00%. After the portland cement has set, the brick is removed from the mold and dried at about 250° to 500° F. The brick may be used in the unburned state, or if desired, can be burned to about 2700° F.

Mixes A and B in Table II approximate the composition of a mix described in prior art Japanese Pat. No. 1981-78476. This prior art mix results in a composition having relatively low density, and when burned at 2700° F., shows an undesirable amount of volume shrinkage.

TABLE II

| Mix Designation: | A | B | C | D |
|---|---|---|---|---|
| Vitreous Silica | 89.7 | 79.6 | 67.6 | 60.2 |
| Quartzite | — | — | 20 | 20 |
| Volatilized Silica | 6.3 | 7.0 | 7.0 | 7.0 |
| White Plaster | — | 3.4 | 3.4 | — |
| Portland Cement | 4.0 | 2.0 | 2.0 | 2.0 |
| Cristobalite | — | 8.0 | — | — |
| Wollastonite | — | — | — | 2.8 |
| Wetting Agent | 0.2 | 0.4 | 0.4 | 0.4 |
| Water | 13.0 | 9.75 | 10.0 | 6.7 |
| Burn: | 2700° F. - 10 Hour Hold | | | |
| Bulk Density, pcf: | 109 | 108 | 104 | 117 |
| Modulus of Rupture, psi: | 690 | 1240 | 870 | 1210 |
| Apparent Porosity: | 22.4 | 25.1 | 28.7 | 19.7 |
| % Volume Change from Dry Size: | −2.6 | −4.6 | +0.4 | +1.1 |
| Typical Screen Analysis: | | | | |
| +10 mesh | 30% ± 3 | | | |
| −10 + 28 mesh | 20 | | | |
| −28 + 65 mesh | 10 | | | |
| −65 mesh | 40 ± 3 | | | |
| −325 mesh | 27 ± 3 | | | |

Mix C shows that the addition of 20% quartzite had an adverse effect on the density but prevented shrinkage in the burn. Mix D shows the effect of adding the combination of 20% quartzite and 2.8% wollastonite. This combination sharply increased the burned density to 117 pcf and prevented any shrinkage in the 2700° F. burn. Only Mix D in Table II meets the specifications of this invention.

A second lot of four castables were made into brick in the same manner as previously described. Their composition is shown in Table III and the variable tested was the addition of 0 to 20% quartzite to the mix. These brick were tested both after being dried at 250° F. and after being burned at 2700° F. with a 10 hour hold. Test data on the brick dried at 250° F. clearly shows an increase in density, increase in strength and a reduction in porosity with the addition of the quartzite (compare Mix E with Mixes F, G and H). Similar results occur in the burned brick and in addition, as the percentage of quartzite increases, the shrinkage in the burned brick is gradually changed to a small expansion. The properties of the burned brick of this invention, Mixes F, G and H, are generally superior to super duty silica brick as shown in Table III.

TABLE III

| Mix Designation: | E | F | G | H | |
|---|---|---|---|---|---|
| Vitreous Silica | 88.2 | 78.2 | 73.2 | 68.2 | |
| Quartzite | — | 10 | 15 | 20 | |
| Volatilized Silica | 7 | 7 | 7 | 7 | |
| Wollastonite | 2.8 | 2.8 | 2.8 | 2.8 | |
| Portland Cement | 2 | 2 | 2 | 2 | |
| Wetting Agent | 0.4 | 0.4 | 0.4 | 0.4 | |
| Water | 9.4 | 7.0 | 6.9 | 6.7 | |
| Burn: | After Drying at 250° F. | | | | |
| Bulk Density, pcf: | 107 | 119 | 120 | 122 | |
| Modulus of Rupture, psi: | 580 | 1260 | 1110 | 1220 | |
| Apparent Porosity: | 22.5 | 15.8 | 14.9 | 15.1 | |
| Burn: | 2700° F. - 10 Hour Hold | | | | Super Duty Silica Brick |
| Bulk Density, pcf: | 109 | 118 | 118 | 117 | 111–115 |
| Modulus of Rupture, psi: | 1270 | 1490 | 1330 | 1210 | 600–1000 |
| Apparent Porosity, %: | 23.3 | 19.1 | 19.3 | 19.7 | 20.0–24.0 |
| % Volume Change From Dry Size | −4.0 | −1.6 | −0.8 | +1.1 | — |

Wollastonite is a calcium metasilicate (CaSiO$_3$) and portland cement's principal ingredient is 3CaO.SiO$_2$.—2CaO.SiO$_2$. Therefore, these two materials supply the lime required to sinter the castable. However, as previously stated, in order for the castable to maintain its strength and refractoriness, the total lime content must be held in the range of 2.5 to 3.2% and preferably between 2.75 and 3.00%. Therefore, the amount of wollastonite and portland cement must be carefully controlled to maintain the correct lime content. In order to do this, if the quantity of portland cement is increased, the quantity of wollastonite must be reduced. There is also some limitation on the quantity of portland cement as it normally contains about 5% alumina and in order to maintain refractoriness, the castable must contain less than 0.3% Al$_2$O$_3$.

To demonstrate the effect of simultaneously varying the wollastonite and portland cement, three castables, designated on Table IV as mixes I, J, and K, were made as previously described, except in this case 0.4 parts of an organic fiber such as vinyl chloride acetate 3 denier×¼", was added to the mix to increase the ease of water removal during drying the castable. About half of the bricks were dried at 500° F. and tested and the other half were burned in a 1500° F. reheat with a five hour hold. These bricks all had good density, porosity, and strength after drying or being burned in a 1500° F. reheat with a five hour hold.

TABLE IV

| Mix Designation: | I | J | K |
|---|---|---|---|
| Vitreous Silica | 67.2 | 68.2 | 58 |
| Quartzite | 20 | 20 | 30 |
| Volatilized Silica | 7.0 | 7.0 | 7.0 |
| Wollastonite | 2.8 | 1.8 | 3.0 |
| White Portland Cement | 2.0 | 3.0 | 2.0 |
| Plus Additions: | | | |
| Wetting Agent, % | 0.4 | 0.4 | 0.4 |
| Vinyl Chloride Acetate Fiber 3 Denier × ¼", % | 0.2 | 0.2 | 0.2 |
| Water Required to Temper, % | 6.6 | 6.6 | 6.6 |
| After Drying at 500° F. | | | |
| Bulk Density | 120 | 120 | 121 |
| Modulus of Rupture | 1150 | 1800 | 1020 |
| Cold Crushing, psi: | 4240 | 8060 | 5460 |
| Apparent Porosity, %: | 12.3 | 13.3 | 14.1 |
| After 1500° F. Reheat | | | |
| Bulk Density, pcf | 117 | 119 | 119 |
| Modulus of Rupture, psi: | 210 | 250 | 140 |
| Cold Crushing, psi: | 2260 | 3380 | 1980 |
| Apparent Porosity, % | 19.2 | 18.4 | 20.5 |

The test results and mix composition in Table V represent the preferred mix of this invention. This mix was made with and without the addition of 0.2% organic fibers. A comparison of the dried brick to burned super duty silica brick show both mixes have excellent properties. Of particular note is the excellent thermal shock resistance of these brick. After placing cold fired brick in a 1500° F. furnace for 5 hours, there is very little loss in strength. Burned or unburned conventional silica brick would crack or shatter in this test.

TABLE V

| Vitreous Silica | | Super Duty Silica Brick |
|---|---|---|
| −6 + 10 mesh | | 41 |
| −10 + 28 mesh | | 9 |
| −28 + 65 mesh | | 1 |
| −65 mesh | 2.2 | |
| −100 mesh | 7 | |
| GP-7 Silica | 8 | |
| Sidley Pebble, −24 mesh | 20 | |
| Wollastonite | 2.8 | |
| Reynolds vs Silica | 7 | |
| White Portland Cement | 2 | |
| Plus Additions: | | |
| Wetting Agent | 0.4 | |
| Vinyl Chloride Acetate Fiber ¼" × 3 Denier | 0.2 | |
| Water | 6.7 | |
| Method of Forming: | Vibration Casting | |
| Casting Characteristics | | |
| Flow: | Good | Good |
| Screeded: | Well | Well |
| Watering Out: | Slight | Slight |
| Bulk Density, pcf: | | |
| After Drying at 250° F. (Av 10): | 118 | 122 | 122-115 |
| After 1500° F. Reheat (Av 3): | 116 | — | — |
| Modulus of Rupture, psi (Av 3) | | | |
| After Drying at 250° F.: | 820 | 1220 | 600-1000 |
| After 1500° F. Reheat: | 170 | — | — |
| After Placing Cold, Dried Brick in 1500° F. Furnace for 5 Hrs (Av 3) | 140 | — | — |
| Cold Crushing Strength, psi (Av 3) | | | |
| After Drying at 250° F.: | 5320 | 6710 | 400-6000 |
| After 1500° F. Reheat: | 2860 | — | — |
| After Placing Cold, Dried Brick in 1500° F. Furnace for 5 hours | 2550 | — | — |
| Apparent Porosity, % (Av 3) | | | |
| After Drying at 250° F.: | 17.0 | 15.1 | 20.24 |
| After 1500° F. Reheat: | 19.5 | — | — |
| Reheat 1500° F. (Av 3) | | | |
| Linear Change, % | +0.4 | — | — |
| Volume Change, % | +1.0 | — | — |
| Screen Analysis % Held on | | | |
| 8 mesh | 7 | | 8 |
| 10 | 20 | 27 | 21 | 29 |
| 14 | 14 | | 13 | |
| 20 | 3 | | 3 | |
| 28 | 3 | 20 | 3 | 19 |
| 35 | 3 | | 3 | |
| 48 | 4 | | 4 | |
| 65 | 5 | 12 | 4 | 11 |
| 100 | 2 | | 3 | |
| 150 | 3 | 5 | 2 | 5 |
| 200 | 4 | | 4 | |
| 270 | 2 | | 2 | |
| 325 | 2 | 8 | 3 | 9 |
| Pass 325 mesh | 28 | 28 | 27 | 27 |

While a preferred embodiment of the present invention has been described, the invention should not be limited thereto, but may be otherwise embodied with the scope of the following claims.

The embodiments of the invention in which an exclusive property or privilege is claimed are defined as follows:

1. A castable silica refractory consisting essentially of 58-78 by weight percent amorphous silica selected from the group consisting of vitreous and fused silica or a combination thereof; 10 to 30 by weight percent quartzite; 4 to 10 by weight percent volatilized silica; 2 to 3 percent by weight wollastonite powder; and 1 to 3 by weight percent white portland cement; plus as additions about 0.4 by weight percent water reducing agent and 6 to 10 by weight percent water.

2. The castable silica refractory in accordance with claim 1 further including 0.2 percent organic fiber.

3. The castable silica refractory in accordance with claim 1 wherein at least 50% of the volatilized and amorphous silica are finer than 0.5 microns.

4. The castable silica refractory in accordance with claim 2 wherein at least 50% of the volatilized and amorphous silica are finer than 0.5 microns.

5. A castable silica refractory consisting essentially of 68 by weight percent amorphous silica selected from the group consisting of vitreous and fused silica or a combination thereof; 20 by weight percent quartzite; 8 by weight percent volatilized silica; 2 by weight percent wollastonite powder; and 2 by weight percent white portland cement; plus as additions about 0.4 by weight percent water reducing agent and 6-10 by weight percent water.

6. The castable silica refractory in accordance with claim 5 further including 0.2 percent organic fiber.

7. The castable silica refractory in accordance with claim 6 wherein at least 50% of the volatilized and amorphous silica are finer than 0.5 microns.

8. The castable silica refractory in accordance with claim 5 wherein at least 50% of the volatilized and amorphous silica are finer than 0.5 microns.

* * * * *